(Model.)

L. BURR.
COTTON BALE BINDER.

No. 277,220. Patented May 8, 1883.

WITNESSES:
Chas. T. Howell
C. Sedgwick

INVENTOR:
L. Burr
BY Munn & Co
ATTORNEYS.

UNITED STATES PATENT OFFICE.

LEWIS BURR, OF SAN ANTONIO, TEXAS.

COTTON-BALE BINDER.

SPECIFICATION forming part of Letters Patent No. 277,220, dated May 8, 1883.

Application filed March 16, 1883. (Model.)

*To all whom it may concern:*

Be it known that I, LEWIS BURR, of San Antonio, Bexar county, and State of Texas, have invented a new and Improved Cotton-Bale Binder, of which the following is a full, clear, and exact description.

My invention consists of a simple contrivance for binding cotton and other bales together when loaded on flat cars to prevent the load from being shaken apart and separated by the shocks and jolts of the car, and also to prevent the bales from being pulled off by cotton thieves, the said contrivance consisting of two or more hooks having pulleys or eyes strung on a rope, the rope being fastened to one of the eyes or pulleys forming one end of the binder, the hooks being caught in the bands of the bales, and the rope passing over the center of the load in a zigzag course to opposite hooks on the opposite bales of the tier, so that the stress of the cord when pulled taut will draw the bales of the respective tiers against each other, thus binding the top tier of the load firmly in a compact mass, which will not be separated by the shocks of the cars, and cannot be pulled apart with the power at command of the thieves, all as hereinafter fully described.

Reference is to be had to the accompanying drawings, forming part of this specification, in which similar letters of reference indicate corresponding parts in both figures.

Figure 1:
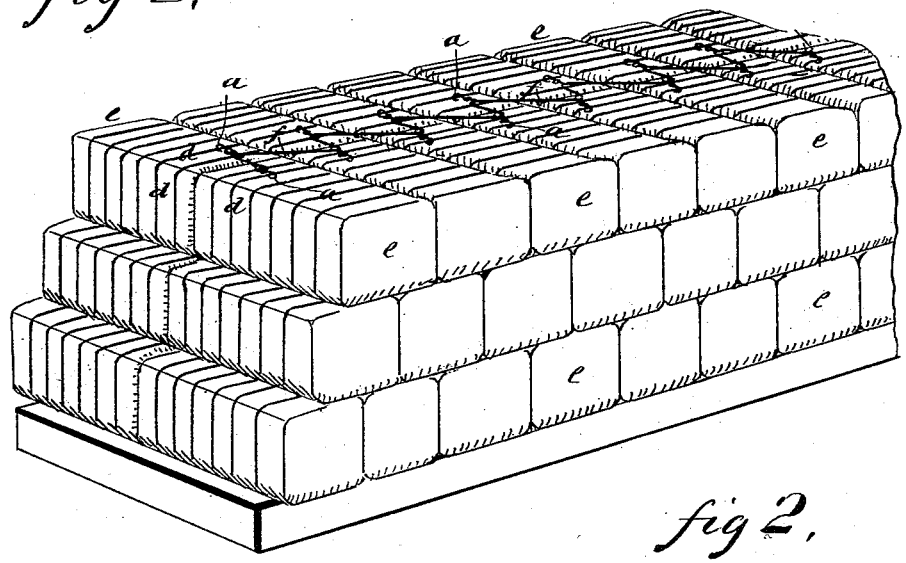
Figure 2:
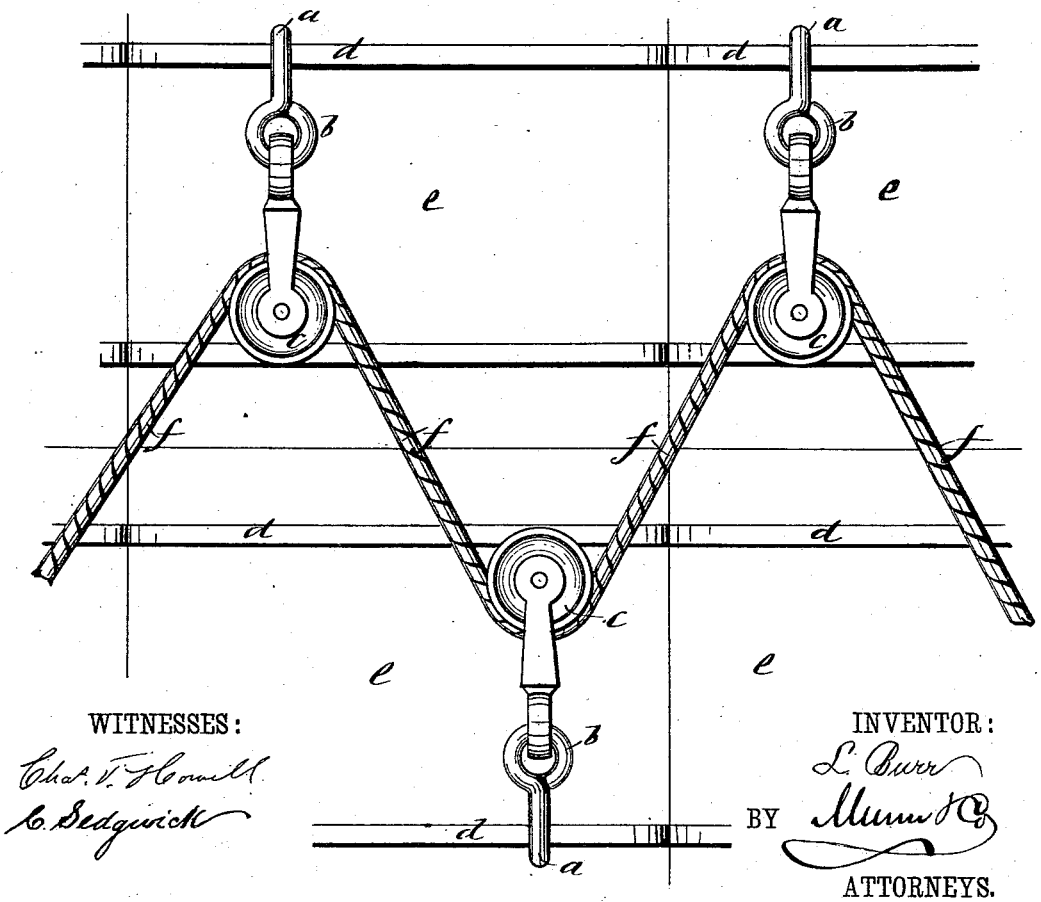

Figure 1 is perspective view of part of a load of cotton-bales on a flat car bound together with my improved device, and Fig. 2 is a central detail in plan view on an enlarged scale.

I take hooks $a$, having an eye, $b$, and either having a pulley, $c$, attached or not, and string them on a rope, $f$, one end of which is connected to the first hook. Then take the first hook and hook it to the second band $d$ from the inner abutting ends of the first bales of the top tier of bales, commencing at, say, the left-hand end of the load. Then connect the second hook to the corresponding band $d$ of the abutting bale and the third hook to the band $d$ of the bale beside the one to which the first hook is connected, and so on until all the bales are bound together, fastening the other end of the rope to any part of the binder in the center of the load.

Generally it will be sufficient to apply the binder to the top layer of bales; but it may be applied to the next layer below the top, or to all, as preferred.

The device is very simple, but will be found an effectual means of keeping the load together on all flat cars or trucks whereon cotton or other bale goods are loaded in two or more tiers side by side and one or more tiers high.

It is to be understood that the hooks are strung on the rope so as not to be taken off, and the binder is connected by taking up the whole device in the hands, beginning at one end of the load and hooking on the hooks one after another, and drawing the rope taut as the respective hooks are connected until all are attached, and then fastening the end of the rope.

Having thus described my invention, I claim as new and desire to secure by Letters Patent—

1. The improved bale-binder consisting of rope $f$, strung through eye or pulley hooks attached to the second bale-bands from the inner abutting ends of the bales of a tier, the rope attached to the end hook at one end of the load and passing to the opposite bales alternately, and being suitably fastened at the other end, substantially as described.

2. The combination, with the bands $d$ of bales arranged in opposite tiers upon a car or truck, of hooks $a$, and a cord, $f$, for the purpose of binding said tiers of bales together, substantially as shown and described.

LEWIS BURR.

Witnesses:
JOHN E. OCHRE,
JAY MINTER.